United States Patent [19]
Beach

[11] 3,736,854
[45] June 5, 1973

[54] FILM METERING MECHANISM FOR CAMERAS

[75] Inventor: David E. Beach, Rochester, N.Y.

[73] Assignee: Eastman Kodak Company, Rochester, N.Y.

[22] Filed: Dec. 1, 1971

[21] Appl. No.: 203,524

[52] U.S. Cl..............95/31 FM, 95/31 FL, 95/31 AC
[51] Int. Cl............................G03b 1/62, G03b 9/68
[58] Field of Search......................95/31 AC, 31 FM, 95/31 FL

[56] References Cited

UNITED STATES PATENTS

| | | | |
|---|---|---|---|
| 3,599,551 | 8/1971 | Lemme | 95/31 AC |
| 3,532,040 | 10/1970 | Ehgartner | 95/31 FM |

FOREIGN PATENTS OR APPLICATIONS

| | | | |
|---|---|---|---|
| 44/3647 | 2/1969 | Japan | 95/31 FM |

Primary Examiner—Robert P. Greiner
Attorney—W. H. J. Kline and Milton S. Sales

[57] ABSTRACT

A camera for perforated roll film includes a transport mechanism for advancing film along an exposure plane and a metering mechanism for selectively disabling the transport mechanism. A film sensing pawl is movable from a retracted position on one side of the exposure plane to an extended position transversing the exposure plane when intersecting one of the film perforations, at which time, movement of the film along the exposure plane moves the sensing pawl to meter the transport mechanism. After exposure, movement of the film moves the sensing pawl into a cam surface to return the pawl to its retracted position. The metering mechanism is moved to an inactive position following film exposure by kinetic energy transferred from a high energy lever used to operate the camera's shutter. A backup system is provided for preventing the metering mechanism from moving to its active position in the event of a false movement of the sensing pawl.

11 Claims, 5 Drawing Figures

PATENTED JUN 5 1973

DAVID E. BEACH
INVENTOR.

BY Milton S. Salus
W. H. J. Kline
ATTORNEYS

DAVID E. BEACH
INVENTOR.

BY Milton S. Sales
W. H. J. Kline
ATTORNEYS

DAVID E. BEACH
INVENTOR.

FILM METERING MECHANISM FOR CAMERAS

CROSS-REFERENCE TO RELATED APPLICATION

Reference is made to commonly assigned, copending U.S. Pat. application Ser. No. 203,733, entitled CAMERA, filed in the names of David E. Beach and Jeffrey R. Stoneham.

BACKGROUND OF THE INVENTION

1. Field of the Invention

The present invention relates to devices for metering film in a roll film camera, and more particularly to such devices for sensing the presence of a film perforation and for selectively locking and releasing the film transport mechanism.

2. Description of the Prior Art

The present invention is an improvement over the invention disclosed in commonly assigned, copending U.S. Pat. application Ser. No. 203,733, entitled CAMERA, filed in the names of David E. Beach and Jeffrey R. Stoneham. The camera disclosed in that application includes a film metering pawl movable into locking engagement with the film transport mechanism when a film sensing pawl detects the presence of a film perforation at a predetermined position along the camera's exposure plane. The sensing pawl is removed from the perforation by the camera's shutter release lever so as not to interfere with subsequent film transport, the operator being required to depress the camera's shutter release button with sufficient force to overcome the force of a spring urging the sensing pawl into the film's perforation. While this type of mechanism for withdrawing the sensing pawl from film perforations has been used in many cameras known in the prior art, the added force required to depress the shutter release button may result in blurred pictures caused by camera unsteadiness.

SUMMARY OF THE INVENTION

I have found that, in cameras having a film metering mechanism operable in response to the detection of a film perforation at a predetermined position along the exposure plane, it is preferable to withdraw the film sensing pawl from the perforation by other than the shutter release lever so that less force is required to trip the shutter. With less force, there is an improvement in camera steadiness resulting in a lesser chance of blurred pictures. Therefore, it is an object of the present invention to provide a camera having a film sensing pawl for detecting the presence of a film perforation with means for removing the pawl from a perforation upon initial advancement of the film subsequent to an exposure. In the preferred embodiment of the present invention, I have provided a cam surface on the metering pawl and an abutment on the camera so that movement of the pawl past its metering position by film transport causes the pawl's cam surface to contact the abutment and to withdraw the pawl from the perforation.

In cameras of the type disclosed in the aforementioned patent application, impact from the kinetic energy of the shutter driver unmeters the film transport mechanism. Occasional malfunction has caused premature metering, thereby preventing film transport and cocking of the high energy lever. Such situations may be caused by unusual friction between the sensing lever and the film causing movement of the sensing pawl to its film metering position. Since the film cannot be advanced and the high energy lever cannot be cocked, nothing can be done to operate the camera short of dismantling the camera and returning the high energy lever to its cocked position. It is therefore another object of the present invention to provide means for preventing metering in such cameras if the high energy lever is not cocked. In accordance with this object, an abutment has been provided on the metering lever in the path of the shutter release lever so that when the shutter release lever is moved in a direction to effect exposure, the abutment is engaged to move the metering lever to its inactive position. The shutter release lever may not be returned until the high energy lever assumes its cocked position.

The invention, and its objects and advantages, will become more apparent in the detailed description of the preferred embodiment presented below.

BRIEF DESCRIPTION OF THE DRAWING

In the detailed description of the preferred embodiment of the invention presented below, reference is made to the accompanying drawing, in which.

DESCRIPTION OF THE PREFERRED EMBODIMENT

Because cameras are well known, the present description will be directed in particular to elements forming part of, or cooperating more directly with, apparatus in accordance with the present invention. It is to be understood that camera elements not specifically shown or described may take various forms well known to those skilled in the art.

Figure 1:
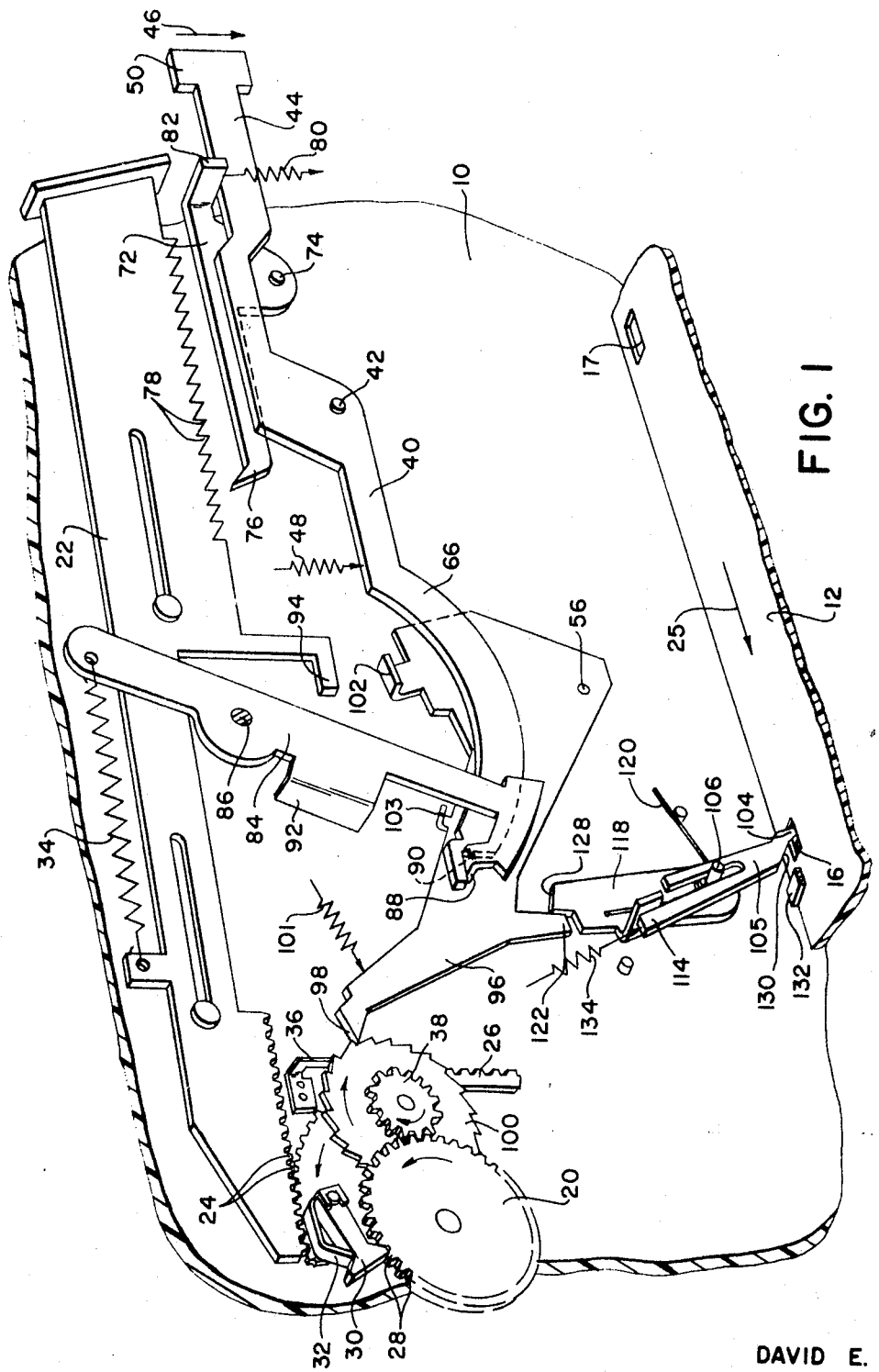
FIG. 1 is a simplified perspective view of a portion of a camera in accordance with the present invention wherein the camera elements are arranged ready to make an exposure.

Referring now to FIG. 1, the camera illustrated as the preferred embodiment includes a housing 10 into which a strip 12 of film with perforations 16 and 17 along one edge has been loaded. The film may be contained in a cartridge of the type shown in coassigned U.S. pat. No. 3,138,081 which issued on June 23, 1964 to Hubert Nerwin.

A slide member 22 is reciprocally mounted on housing 10 by a pin-in-slot arrangement. The slide member has a rack with a plurality of teeth 24 in meshing engagement with the teeth of a gear sector 26 coaxially rotatable with a gear 20. Rotation of gear 20 in a counterclockwise direction winds film in the direction of arrow 25. The gear has teeth 28 in meshing engagement with a ratchet pawl 30 rotatably mounted on gear sector 26. Pawl 30 is biased by a spring 32 into engagement with the teeth of gear 20 so that upon movement of slide member 22 to the left as viewed in FIG. 1, the rotary movement of gear sector 26 is transmitted to gear 20, thereby advancing film along the camera's exposure plane. As slide member 22 is returned to the right by a coil spring 34, gear 20 is prevented from rotating in a clockwise direction by a leaf spring 36 which cooperates with the teeth on a ratchet wheel 100 on a gear 38 in meshing engagement with gear 20.

A shutter release lever 40 is pivotally mounted on a stud 42 and includes an arm 44 which may be manually depressed in the direction of arrow 46 to rotate lever 40 in a clockwise direction against the force of a spring 48. Arm 44 may be either directly moved by pushing down on an end portion 50, or there may be an intermediate member between a body release button, not shown, and the arm. Movement of the shutter release lever 40 in a counterclockwise direction by spring 48 is limited by an abutment 88 on a high energy lever 84. Shutter release lever 40 has an arcuate portion 66 which is lifted by the clockwise rotation of the shutter release lever.

An anti-short stroke lever 72 is mounted on housing 10 for rotation about a stud 74. Lever 72 carries a ratchet pawl 76 which may engage ratchet teeth 78 on slide member 22. A spring 80 tends to rotate lever 72 in a clockwise direction to engage ratchet pawl 76 and ratchet teeth 78, but the lever is normally held in the disengaged position shown by a tab 82 which engages arm 44 of shutter release lever 40.

A high energy lever 84 is mounted on housing 10 and is biased by spring 34 for rotation in a counterclockwise direction about a stud 86. Lever 84 is held against such rotation by a tab 88 which latches over a surface 90 on arcuate portion 66 of the shutter release lever until the shutter release lever is rotated in a clockwise direction. A bent tab portion 92 on high energy lever 84 is aligned with a push member 94 on slide member 22 to cock the high energy lever when the slide lever is moved to the left, as will be explained hereinafter.

Metering lever 96 is rotatably carried on housing 10 by a stud 56 and carries a metering pawl 98 urged toward an active position in engagement with the teeth of ratchet 100 by a spring 101 to prevent rotation of gear 38. A tab 102 is carried by metering lever 96 in alignment with high energy lever 84, and a second tab 103 is in alignment with arcuate portion 66 of shutter release lever 40.

A film sensing pawl 104 on a sensing finger 105 is mounted for rotational and longitudinal movement on a stud 106 on camera housing 10. Sensing finger 105 has a tab 114. A retainer 118 is also rotatably carried by stud 106 and is urged in a counterclockwise direction by a spring 120 into abutment with a tab 122 on metering lever 96 or tab 114 on sensing finger 103.

OPERATION

FIG. 1 shows the elements of the camera in their respective positions after an unexposed frame of film has been wound into the exposure area. The camera is now ready to be operated to take a picture. Metering pawl 98 of lever 96 is in its active position in engagement with ratchet 100 so that slide member 22 cannot be moved to the left to transport more film. Film sensing pawl 104 is extended into perforation 16 in the film, and high energy lever 84 has been put into a cocked position by push member 94 of the slide member and is held there against the force of spring 34 by tab 88 engaging surface 90 on arcuate portion 66 of the shutter release lever. Anti-short stroke lever 72 is held against spring 80 by tab 82 engaging arm 44 to keep pawl 76 out of ratchet teeth 78.

Figure 2:
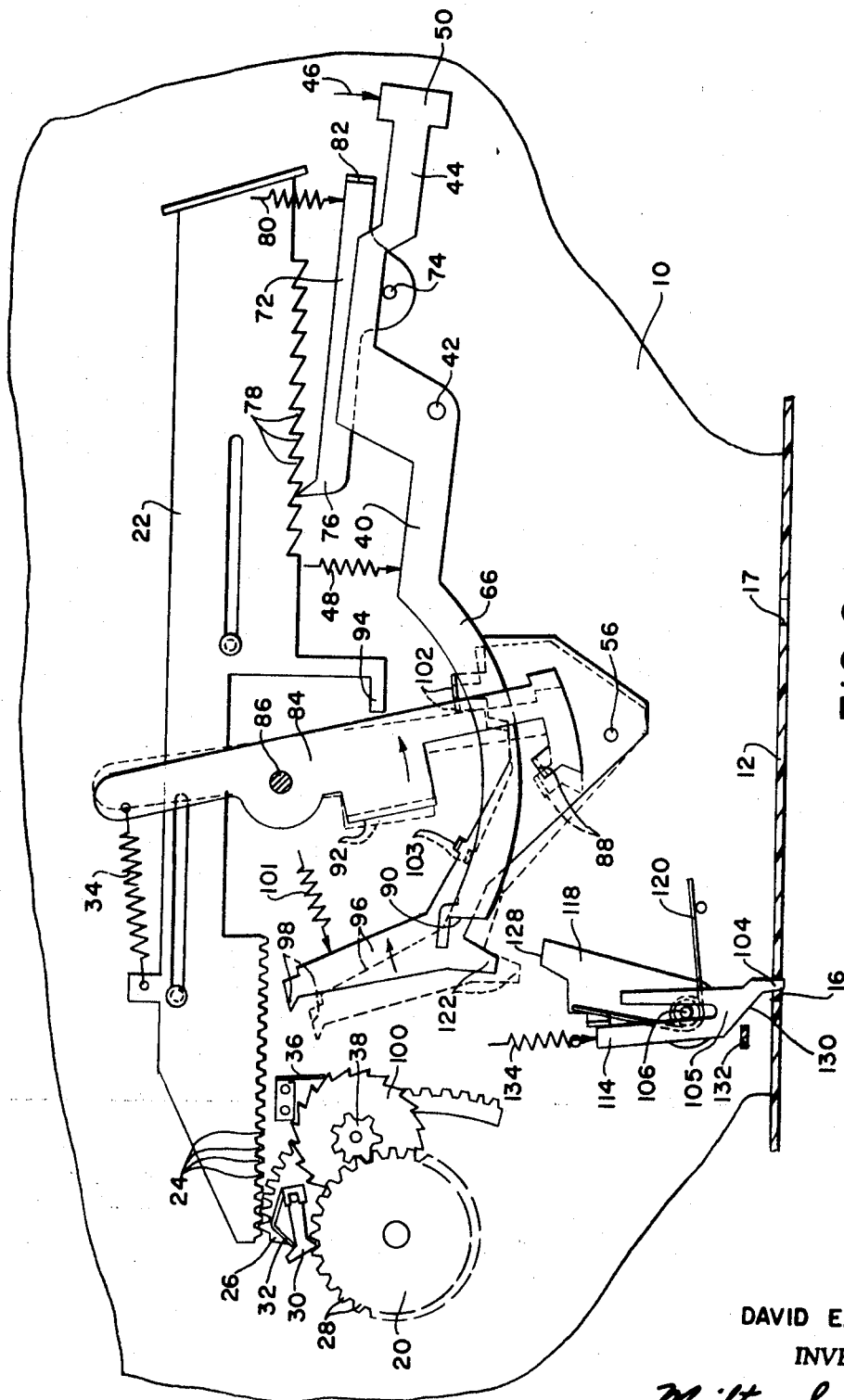
FIG. 2 is an elevational view of the camera of FIG. 1 showing the position of the camera elements after an exposure has been made.

To expose a picture, end portion 50 is depressed to rotate shutter release lever 40 in a clockwise direction against spring 48. Referring to FIG. 2, this raises arcuate portion 66 so that metering lever 96 is raised to its phantom line position by tab 103 and so that tab 88 slips over surface 90 to permit high energy lever 84 to rotate about pivot 86 toward its released position. During its rotation, the high energy lever contacts a portion of the camera's shutter, not shown, to actuate the shutter. As the high energy lever comes into contact with tab 102 of metering lever 96, it transfers kinetic energy to the metering lever to move the lever to its full line position shown in FIG. 2. Upon clockwise rotation of arm 44, pawl 76 of anti-short stroke lever 72 is raised to engage ratchet teeth 78. When end portion 50 of the shutter release lever is released, it can only rotate in a counterclockwise direction until the lower surface of arcuate portion 66 abuts tab 88 on the high energy lever. This keeps arm 44 out of engagement with tab 82 so that anti-short stroke lever 72 remains in its operative position shown in FIG. 2.

Because metering pawl 98 has been disengaged from ratchet 100, advance slide 22 can now be moved to the left. Such movement rotates gear sector 26 in a counterclockwise direction, causing similar rotation of gear 20 and clockwise rotation of gear 38 and ratchet 100. Rotation of gear 20 causes film to be advanced to the left as viewed in FIG. 3 to begin rotating film sensing finger 105 in a clockwise direction. This brings a cam surface 130 on the sensing finger into engagement with an abutment 132 on the camera housing so that sensing pawl 104 is withdrawn upwardly from perforation 16. After the sensing pawl clears the perforation, spring 120 rotates retainer 118 and sensing finger 105 in a counterclockwise direction to its full line position shown in FIG. 4, tab 122 on metering lever 96 having been lifted out of the notch in the top of the retainer. Tab 122 of the metering lever is now positioned above an abutment surface 128 on the retainer to prevent the metering lever from returning to its original position. Sensing pawl 104 now rests on the film surface and is urged against that surface by a spring 134.

Figure 3:
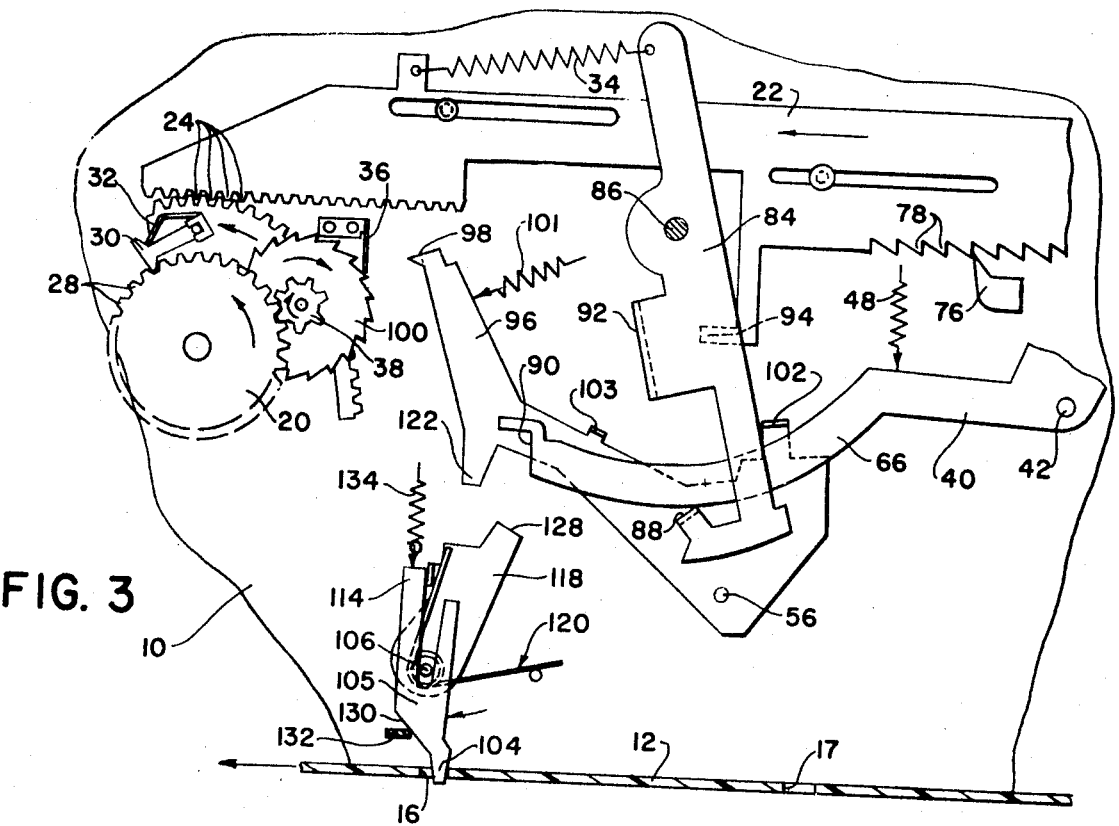
FIG. 3 is an elevational view similar to FIG. 2 showing the position of the camera elements during the initial film transport operation.
Figure 4:
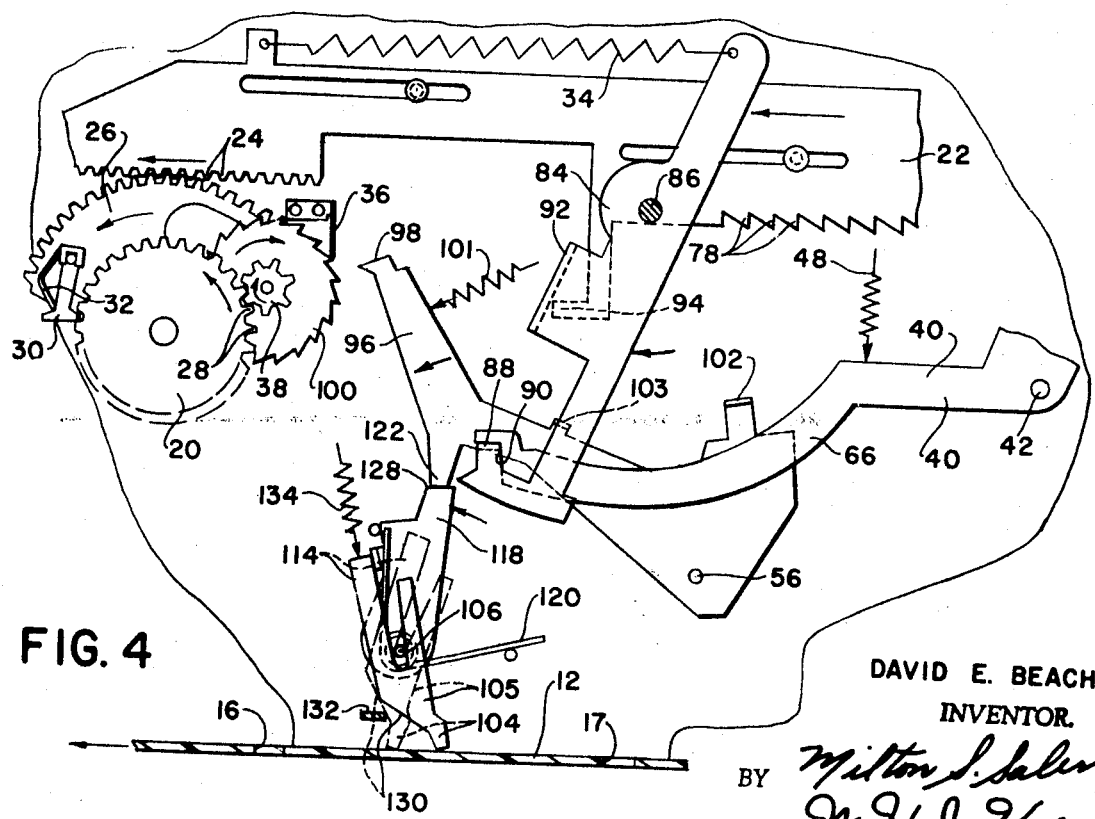
FIG. 4 is an elevational view similar to FIG. 1 showing the position of the camera elements during film transport after the high energy lever has been cocked.

As slide member 22 is moved to the left, pushing member 94 rotates high energy lever 84 in a clockwise direction until its tab 88 falls over surface 90 on shutter release lever 40. This latches the high energy lever in its cocked position shown in FIG. 4, and allows further counterclockwise direction of the shutter release lever to withdraw ratchet pawl 76 from teeth 78 so that the slide may be returned to the right. In the preferred embodiment, more than one actuation of slide member 22 is required to advance film by one frame. Therefore, after one such actuation, the camera elements are positioned as shown in FIG. 3 with sensing pawl 104 somewhere between film perforations 16 and 17. Since metering lever 96 is retained in its FIG. 2 position by surface 128 of retainer 118, slide member 22 is free to be moved again to the left.

Figure 5:
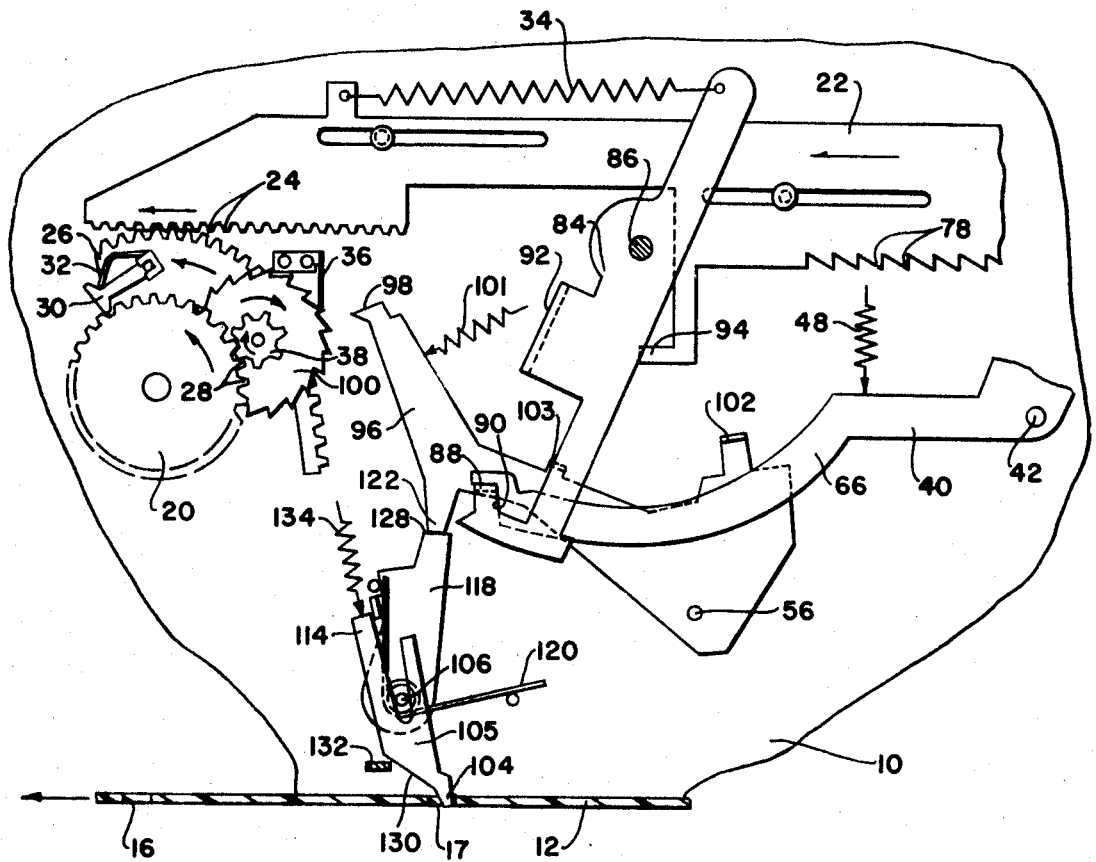
FIG. 5 is an elevational view similar to FIG. 4 showing the position of the camera elements during final film transport operation.

When the next succeeding film perforation 17 reaches the position of sensing pawl 104, the pawl drops into the perforation as shown in FIG. 5. As the operator continues to move slide member 22 to the left, the trailing edge of perforation 17 causes clockwise rotation of sensing finger 105 and retainer 118 to remove surface 128 from below tab 122 of metering lever 96, thereby allowing the metering lever to be moved by spring 101 to its position shown in FIG. 1 preventing further movement of slide member 22 to the left. Since anti-short stroke member 72 has been held in its FIG. 1 position throughout the entire second operation of slide member 22, it cannot prevent return movement of the slide member after the film advance mechanism has been locked up.

Should metering pawl 98 be permitted to move to its active position in engagement with ratchet 100 while high energy lever 84 is in its uncocked position shown in FIG. 3, such an occurrence possibly occurring because of unusually high friction between film 12 and sensing pawl 104, the camera would be virtually useless in that slide member 22 could not be moved to the left to either advance film or to move high impact lever 84 to its cocked position. Therefore, structure to prevent such an occurrence must be provided. Since arcuate portion 66 of shutter release lever 40 will be held in its raised position shown in FIG. 3 by tab 88 whenever high energy lever 84 is uncocked, metering lever 96 is prevented from falling to its active position by tab 103 engaging the top of arcuate portion 66. Now slide member 22 can be moved to the left to recock high energy lever 84 and to advance the film to the next frame. After this, normal camera operation may be resumed.

The invention has been described in detail with particular reference to a preferred embodiment thereof, but it will be understood that variations and modifications can be effected within the spirit and scope of the invention.

I claim:

1. In a camera adapted to receive and use film of a type having spaced metering perforations, said camera including (1) a transport mechanism for advancing film along the camera exposure plane, (2) a film sensing pawl movable between a retracted position on one side of the exposure plane and an extended position transversing said exposure plane, (3) a metering mechanism having an active condition disabling said transport means and an inactive condition, (4) means, operatively associated with said sensing pawl and said metering mechanism, for permitting movement of said metering mechanism to its active condition upon movement of said sensing pawl to a predetermined location along said exposure plane, and (5) means operable for replacing said metering mechanism in its inactive condition; the improvement comprising means for moving said sensing pawl from its extended position to its retracted position upon movement of film along the exposure plane by said transport mechanism, said last-mentioned means including:

an abutment mounted in said camera and extending in a position for cooperation with said sensing pawl;
a cam surface on one of said sensing pawl and said abutment; and
a cooperative surface on the other of said sensing pawl and said abutment cooperable with said cam surface.

2. In a camera having (1) a transport mechanism for advancing perforated roll film along a camera exposure plane and (2) a metering mechanism having an active condition disabling said transport means and an inactive condition; the improvement comprising:

a film sensing pawl having (1) a first degree of freedom for movement in directions generally toward and away from said exposure plane between a retracted position on one side of said exposure plane and an extended position transversing said exposure plane and (2) a second degree of freedom for movement in directions generally parallel to said exposure plane, said pawl being movable in one of said directions parallel to said exposure plane by the trailing edge of a film perforation as the film is advanced along said exposure plane; and
means for moving said sensing pawl to its retracted position upon movement of said sensing pawl in said one direction.

3. The improvement as defined in claim 2 wherein said means for moving said sensing pawl to its retracted position comprises cam means.

4. The improvement as defined in claim 2 wherein said means for moving said sensing pawl to its retracted position comprises:

an abutment mounted on said camera and extending in a position for cooperation with said sensing pawl;
a cam surface on one of said sensing pawl and said abutment; and
a cooperative surface on the other of said sensing pawl and said abutment cooperable with said cam surface during movement of said sensing pawl in said second direction to withdraw said sensing pawl from the film perforation upon movement of said sensing pawl in said second direction beyond said first predetermined distance.

5. In a camera having (1) a housing including a space for receiving roll film perforated at predetermined metering intervals, (2) means defining an exposure plane, (3) transport means for advancing film along said exposure plane, (4) a metering mechanism having an active condition disabling said transport means and an inactive condition, (5) a shutter release lever movable from a first position to a second position for effecting exposure of the film at said exposure plane, and (6) means for placing said metering mechanism in its inactive condition when said shutter release lever is moved to its second position, the improvement comprising:

a film sensing pawl movable (1) in a first direction generally transverse to said exposure plane between a retracted position on one side of said exposure plane and an extended position tranversing said exposure plane and (2) in a second direction generally parallel to said exposure plane, said sensing pawl being moved in its second direction by the trailing edge of a film perforation as the film is advanced along said exposure plane by said transport means;
means placing said metering mechanism in its active condition upon movement of said sensing pawl a first predetermined distance in said second direction; and
means for moving said sensing pawl to its retracted position upon movement of said sensing pawl in said second direction beyond said first predetermined distance.

6. In a camera having (1) a housing including a space for receiving roll film perforated at predetermined metering intervals, (2) means defining an exposure plane, (3) transport means for advancing film along said exposure plane, (4) a metering mechanism having an active condition disabling said transport means and an inactive condition, (5) means for releasably latching said metering mechanism in its inactive condition, (6) means urging said metering mechanism into its active condition, (7) a shutter release lever movable from a first position to a second position for effecting exposure of the film at said exposure plane, and (8) means for placing said metering mechanism in its inactive condition when said shutter release lever is moved to its second position, the improvement comprising:

a film sensing pawl movable from a retracted position contacting a surface of the film along said exposure plane through (1) an extended position transversing said exposure plane when intercepting at least one of the film perforations and (2) a metering position, said sensing pawl being moved from its extended position through its metering position by the trailing edge of a film perforation as the film is advanced along said exposure plane by said transport means;

spring means urging said sensing pawl toward its extended position;

means interconnecting said sensing pawl and said latching means for releasing said latching means when said sensing pawl is moved to its metering position whereupon said transport means is disabled until said shutter release lever is moved to its second position; and means for moving said sensing pawl from its metering position to its retracted position upon advancement of the film along said exposure plane after said metering mechanism has been placed in its inactive condition by movement of said shutter release lever to its second position.

7. The improvement as defined by claim 6 wherein said means for moving said sensing pawl to its retracted position comprises:

an abutment mounted on said camera and extending in a position for cooperation with said sensing pawl;

a cam surface on one of said abutment and said sensing pawl;

a cooperative surface on the other of said abutment and said sensing pawl cooperative with said cam surface to move said sensing pawl to its retracted position upon movement of said sensing pawl beyond its metering position by the trailing edge of a film perforation.

8. The improvement as defined in claim 6 further comprising means on said high energy lever for holding said shutter release lever in its second position when said high energy lever is in other than its cocked position.

9. In a camera having (1) a housing including a space for receiving roll film, (2) means defining an exposure plane, (3) transport means for advancing film along said exposure plane, (4) a high energy lever movable from a cocked position to a released position for effecting exposure of the film at said exposure plane, (5) means resiliently urging said high energy lever toward its released position, (6) means for releasably latching said high energy lever in its cocked position, and (7) a shutter release lever movable from a first position to a second position for releasing said latching means; the improvement comprising:

a metering mechanism having an active condition disabling said transport means and an inactive condition;

means associated with said high energy lever and said metering mechanism for placing said metering mechanism in its inactive condition upon movement of said high energy lever from its cocked position to its released position; and means associated with said shutter release lever and said metering mechanism for placing said metering mechanism in its inactive condition upon movement of said shutter release lever to its second position.

10. The improvement as defined in claim 9 further comprises spring means biasing said metering mechanism toward its active condition, and wherein said means associated with said high energy lever and said metering mechanism comprises abutment means on said metering mechanism and said high energy lever for transmitting the kinetic energy of said high energy lever during its movement toward its second position to said metering mechanism to move said metering mechanism against the force of said spring means.

11. The improvement as defined by claim 10 further comprising means for releasably holding said metering mechanism in its inactive condition, wherein said means associated with said metering mechanism and said shutter release lever may be used to place said metering mechanism in its inactive condition if said holding means is released and said high energy lever is in its released position.

* * * * *

Disclaimer 3,736,854.—*David E. Beach*, Rochester, N.Y. FILM METERING MECHANISM FOR CAMERAS. Patent dated June 5, 1973. Disclaimer filed Jan. 31, 1978, by the assignee, *Eastman Kodak Company*.

Hereby enters this disclaimer to claims 1 through 11 of said patent.

[*Official Gazette March 28, 1978.*]